(12) United States Patent
Aoyama et al.

(10) Patent No.: US 11,759,881 B2
(45) Date of Patent: *Sep. 19, 2023

(54) SUPPLY ROD FOR SHAFT-LIKE COMPONENT

(71) Applicant: Shoji Aoyama, Osaka (JP)

(72) Inventors: Shoji Aoyama, Osaka (JP); Yoshitaka Aoyama, Osaka (JP)

(73) Assignee: AOYAMA, SHOJI, Osaka (JP)

( * ) Notice: Subject to any disclaimer, the term of this patent is extended or adjusted under 35 U.S.C. 154(b) by 572 days.

This patent is subject to a terminal disclaimer.

(21) Appl. No.: 16/958,932

(22) PCT Filed: Dec. 3, 2018

(86) PCT No.: PCT/JP2018/044343
§ 371 (c)(1),
(2) Date: Jun. 29, 2020

(87) PCT Pub. No.: WO2019/155743
PCT Pub. Date: Aug. 15, 2019

(65) Prior Publication Data
US 2020/0338662 A1    Oct. 29, 2020

(30) Foreign Application Priority Data
Feb. 6, 2018    (JP) ................. 2018-031337

(51) Int. Cl.
*B23P 19/00*    (2006.01)
*B23K 11/14*    (2006.01)
(52) U.S. Cl.
CPC ............ *B23K 11/14* (2013.01); *B23P 19/001* (2013.01)

(58) Field of Classification Search
CPC ........ B23K 11/14; B23K 9/201; B23K 9/206; B23K 9/207; B23K 11/0053; B23K 11/36;
(Continued)

(56) References Cited

U.S. PATENT DOCUMENTS 5,007,795 A    4/1991    Yoshimura
5,035,039 A *  7/1991    Aoyama ............... B23P 19/006
                                                          29/445

(Continued)

FOREIGN PATENT DOCUMENTS

JP    2-56304    2/1990
JP    02-056305    2/1990
(Continued)

OTHER PUBLICATIONS

Translation of JP2015-131339 (Year: 2015).*

(Continued)

*Primary Examiner* — Nathaniel E Wiehe
*Assistant Examiner* — Elizabeth M Kerr
(74) *Attorney, Agent, or Firm* — Wenderoth, Lind & Ponack, L.L.P.

(57) ABSTRACT

A projection portion is formed on a distal end surface of a supply rod with which a surface of a flange is brought into close contact. A circular-arc receiving surface is formed at a boundary portion between the distal end surface and the projection portion, and is configured to fit a flange outer peripheral portion. One side of the circular-arc receiving surface is continuous with the distal end surface, and another side of the circular-arc receiving surface is continuous with an inclined guide surface. The close contact of the flange with the distal end surface is achieved with a magnet of an advancing/retreating type provided in the supply rod.

1 Claim, 5 Drawing Sheets

(58) Field of Classification Search
CPC ..... B23P 19/001; B23P 19/006; B23P 19/007; B23P 19/003
See application file for complete search history.

(56) References Cited

U.S. PATENT DOCUMENTS

| | | | | |
|---|---|---|---|---|
| 11,179,818 B2* | 11/2021 | Aoyama | ................ | B23P 19/06 |
| 2010/0059486 A1* | 3/2010 | Aoyama | ................ | B23P 19/06 219/79 |

FOREIGN PATENT DOCUMENTS

| | | |
|---|---|---|
| JP | 4-286530 | 10/1992 |
| JP | 8-26476 | 1/1996 |
| JP | 11-239885 | 9/1999 |
| JP | 2015-131339 | 7/2015 |
| JP | 2015131339 A * | 7/2015 |

OTHER PUBLICATIONS

Extended European Search Report dated Aug. 13, 2021 in corresponding European Patent Application No. 18904976.0.
International Preliminary Report on Patentability and Written Opinion of the International Searching Authority dated Aug. 11, 2020 in International (PCT) Patent Application No. PCT/JP2018/044343.
International Search Report dated Feb. 12, 2019 in International (PCT) Application No. PCT/JP2018/044343.

* cited by examiner

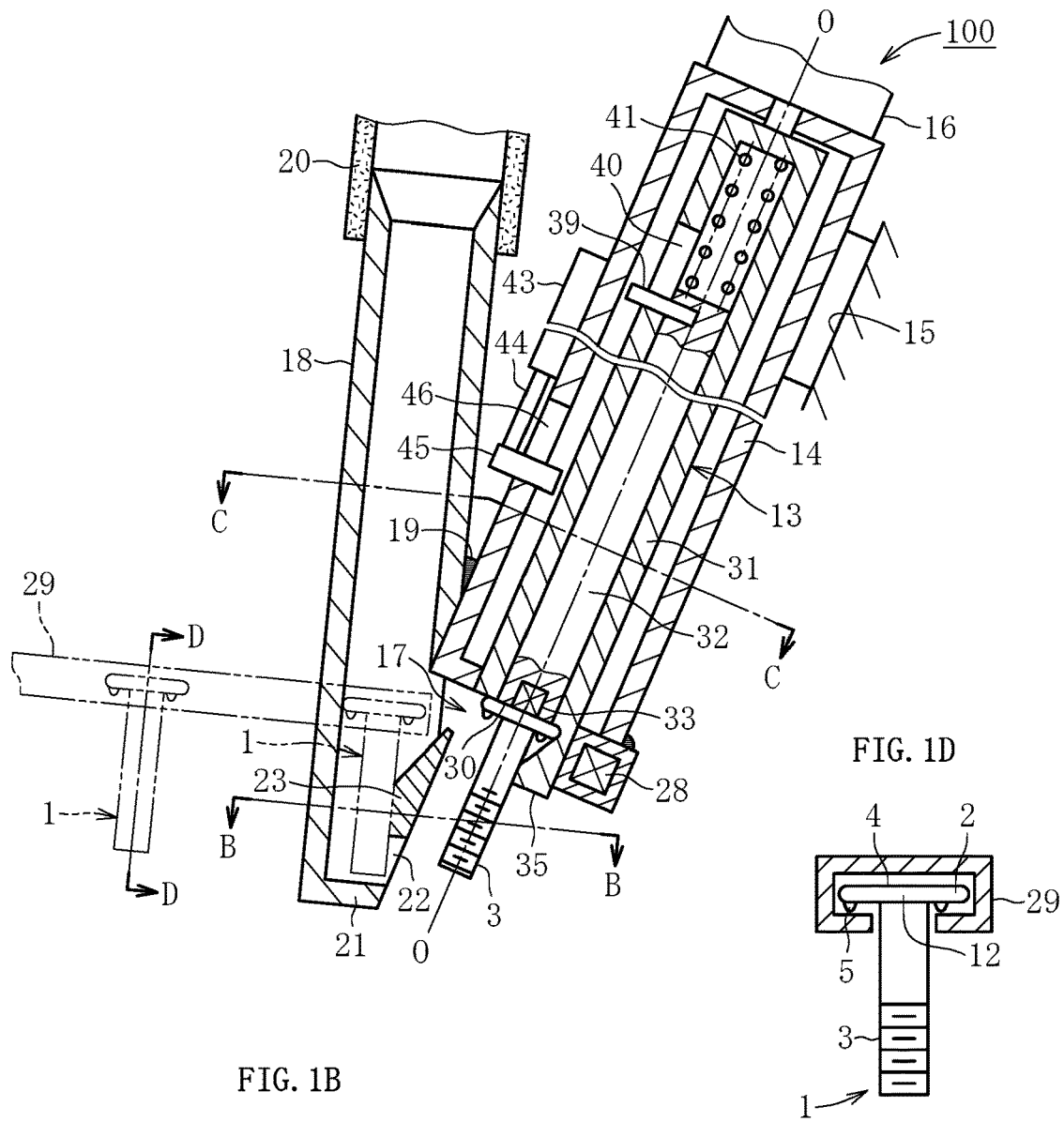
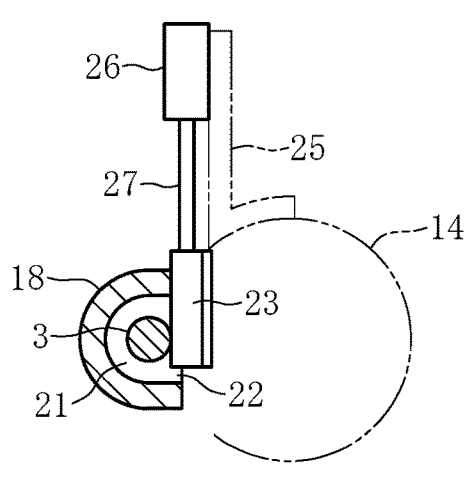
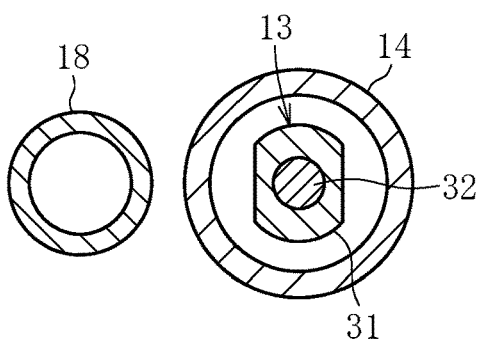

SUPPLY ROD FOR SHAFT-LIKE COMPONENT

TECHNICAL FIELD

This invention relates to a supply rod configured to supply a shaft-like component having a circular flange and a shaft portion integrated with each other.

BACKGROUND ART

A supply rod described in Japanese Patent Application Laid-open No. Hei 2-56305 (Patent Literature 1) is configured to supply a shaft-like component having a circular flange and a shaft portion integrated with each other. In use of this supply rod, the flange is brought into close contact with a distal end surface of the supply rod having a projection piece, and a distal end portion of the shaft-like component is advanced to a vicinity of a target location. After that, the close contact of the flange is released, and the shaft-like component is inserted into an opening as the target location, while allowing the shaft-like component to make a circular-arc motion about the projection piece of the supply rod.

CITATION LIST

Patent Literature 1: JP 2-56305 A

SUMMARY OF INVENTION

Technical Problem

The supply rod described in the patent literature 1 mentioned above has the projection piece having a shape obtained by bending a plate-shaped member into a substantially V-shape. When the flange is held in close contact with the distal end surface of the supply rod, the flange of the shaft-like component is held in point contact at an outer peripheral portion thereof with an inner surface of the projection piece. When such point contact is given, application of even a slight force may cause displacement of the flange position along the inner surface of the projection piece, with the result that a center axis of the shaft-like component deviates from a center axis of the supply rod. When such deviation occurs, there arises a problem in that the shaft portion is not correctly inserted into a target location such as a screw hole or an opening of a component.

Further, the inner surface of the projection piece is flat, and hence a contact location between the flange outer peripheral portion and the inner surface of the projection piece is not fixed at a certain location. Thus, when the shaft-like component makes the circular-arc motion, a circular-arc trajectory to be generated is not uniform. Therefore, the distal end of the shaft portion is not correctly inserted into the opening being the target location, with the result that so-called erroneous supply occurs.

The present invention has been provided to solve the problems described above, and has an object to allow a shaft-like component, which is retained at a distal end portion of a supply rod, to be accurately positioned on a center axis of the supply rod and inserted into an opening as a target location such that a shaft portion always generates a uniform circular-arc trajectory.

Solution to Problem

According to the present invention, there is provided a supply rod for shaft-like component, which is configured to supply a shaft-like component having a circular flange and a shaft portion integrated with each other, the supply rod comprising: a projection portion formed on a distal end surface of the supply rod with which a surface of the flange is to be brought into close contact; and a circular-arc receiving surface formed at a boundary portion between the distal end surface and the projection portion, the circular-arc receiving surface being configured to fit an outer peripheral portion of the flange, wherein the circular-arc receiving surface has a circular-arc shape about a center axis of the supply rod, wherein, when seen in a cross-sectional direction along the center axis, one side of the circular-arc receiving surface is continuous with the distal end surface, and another side of the circular-arc receiving surface is continuous with an inclined guide surface, and wherein the close contact of the surface of the flange with the distal end surface is achieved with a magnet of an advancing/retreating type provided in the supply rod.

Advantageous Effects of Invention

When the flange of the shaft-like component approaches the vicinity of the distal end surface of the supply rod, the flange advances to the circular-arc receiving surface formed at the boundary location between the distal end surface and the projection portion of the supply rod, thereby causing the outer peripheral portion of the flange to fit the circular-arc receiving surface and causing the surface of the flange to be attracted to the distal end surface of the supply rod by an attraction force of the magnet at the advanced position. With such operation, while one side of the circular-arc receiving surface is continuous with the distal end surface, the surface of the flange is brought into close contact with the distal end surface of the supply rod, and at the same time, the flange outer peripheral portion fits the circular-arc receiving surface. Therefore, the flange is positioned in an axial direction and a radial direction of the shaft-like component so that the shaft-like component is retained on the center axis of the supply rod.

After that, when the magnet retreats so that the attraction force acting on the shaft-like component is substantially eliminated, while another side of the circular-arc receiving surface is continuous with the inclined guide surface, the flange outer peripheral portion starts sliding on the inclined guide surface, and at the same time, the shaft portion also slides on the projection portion, that is, the shaft-like component falls by its own weight while exhibiting a state of sliding at two locations. Since there are two sliding locations as such manner, the circular-arc trajectory of the shaft-like component is always maintained uniform, and the distal end of the shaft-like component accurately approaches an opening as the target location. Moreover, the shaft-like component performs the falling motion exhibiting the circular-arc trajectory immediately from the state in which the surface of the flange is held in close contact with the distal end surface of the supply rod. Thus, the attraction force of the magnet is eliminated, and at the same time, a smooth falling motion of the shaft-like component is started. That is, the inclined guide surface is continuous with the circular-arc receiving surface, and hence the flange outer peripheral portion can start the sliding motion on the inclined guide surface immediately from the circular-arc receiving surface, thereby forming the uniform circular-arc trajectory described above.

A circular-arc-shaped portion of the flange outer peripheral portion fits a circular-arc-shaped portion of the circular-arc receiving surface, and the surface of the flange is attracted to the distal end surface of the supply rod. With this, the shaft-like component is positioned on the center axis. Thus, even when some external force acts on the shaft-like component, accuracy of the retaining position of the shaft-like component is not easily lost, and hence the retaining position is reliably maintained.

As described above, owing to the positioning of the flange at the distal end portion of the supply rod and the sliding motion at the two locations during falling of the shaft-like component, the retaining position of the shaft-like component with respect to the supply rod is accurately maintained. Further, when the shaft-like component falls, the uniform circular-arc trajectory is always generated, thereby being capable of securing the supply rod with high accuracy and reliability. At the same timing as the start of the falling of the shaft-like component, the flange outer peripheral portion slides on the inclined guide surface, thereby reliably achieving the sliding motions at the two locations described above.

The present invention is provided as the supply rod in the viewpoints described above. However, the present invention may be provided also as an apparatus comprising such a supply rod.

BRIEF DESCRIPTION OF DRAWINGS

FIG. 1A is a sectional view for illustrating an entire apparatus.

FIG. 1B is a sectional view taken along the line B-B of FIG. 1A.

FIG. 1C is a sectional view taken along the line C-C of FIG. 1A.

FIG. 1D is a sectional view taken along the line D-D of FIG. 1A.

DESCRIPTION OF EMBODIMENTS

Figure 2:
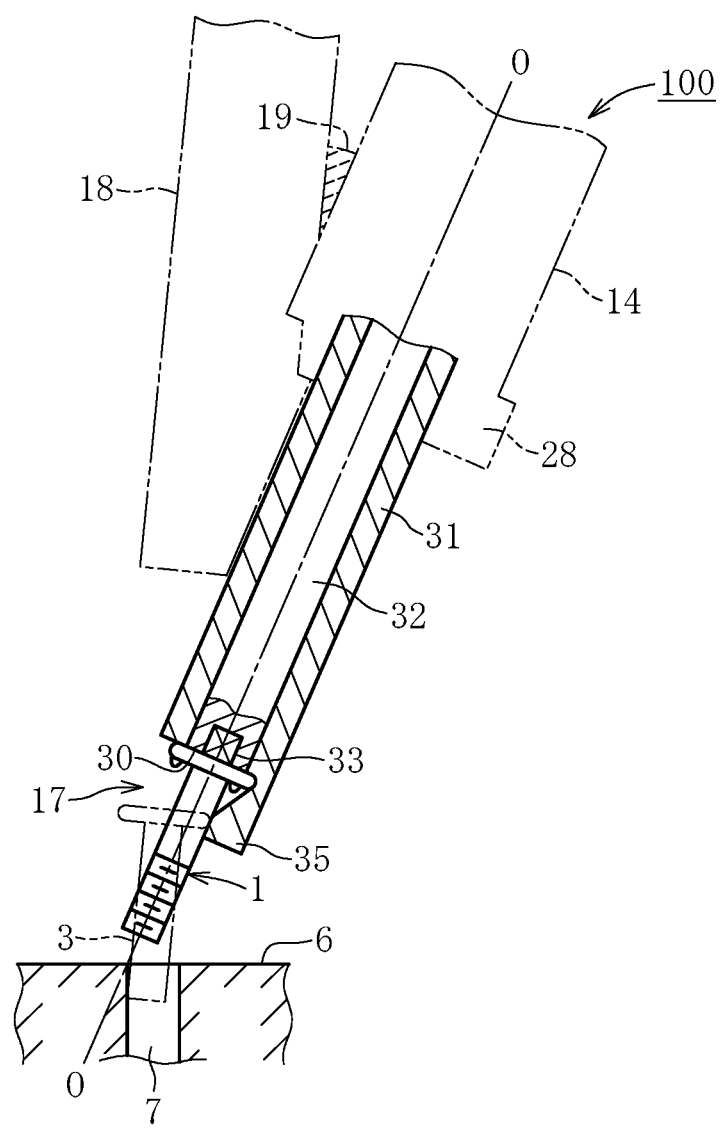
FIG. 2 is a sectional view for illustrating an advanced state of a supply rod.

Next, a supply rod for shaft-like component according to an embodiment of the present invention is described.

Embodiment

FIG. 1 to FIG. 5 show the embodiment of the present invention.

First, a shaft-like component is described.

Various examples of the shaft-like component comprise a general bolt having a hexagonal head portion and a projection bolt having a flange. In this embodiment, the latter projection bolt is supplied. In the following description, the projection bolt is sometimes simply referred to as "bolt".

As illustrated in the drawings, a shaft-like component 1 is a projection bolt comprising a circular flange 2 and a shaft portion 3. The shaft portion 3 has a male screw and is integrally provided at a center portion of the circular flange 2. A flange surface located on a side opposite to the shaft portion 3 is a surface 4 having a flat circular shape, and three projections 5 for welding are formed at 120-degrees intervals on a back surface. The bolt 1 is made of iron, which is a magnetic material. An outer peripheral portion 12 of the flange 2 is denoted by symbol 12, and has a round shape over the entire circumference in the case illustrated in the drawings. With regard to dimensions of parts of the projection bolt being the shaft-like component, the flange 2 has a diameter of 22 mm and a thickness of 5 mm, and the shaft portion has a length of 40 mm and a diameter of 8 mm. The bolt is also denoted by symbol 1.

Next, an entire apparatus is described.

The apparatus in this embodiment is a bolt supply apparatus and is denoted by symbol 100. In the case of FIG. 1 and FIG. 2, the bolt 1 is supplied to a component 6 having a hole in a stationary state, and the shaft portion 3 is inserted into an opening 7. In the case illustrated in FIG. 4 and FIG. 5, a steel-sheet component 9 is placed on a fixed electrode 8, and the shaft portion 3 is inserted into a prepared hole 10 of the steel-sheet component 9 and a receiving hole 11 of the fixed electrode 8. Illustration of a movable electrode of an advancing/retreating type which is paired with the fixed electrode 8 in a coaxial state is omitted.

A supply rod 13 configured to advance and retreat obliquely downward is accommodated in an outer cylinder 14 having a circular sectional shape. The outer cylinder 14 is fixed to a stationary member 15 such as a machine frame of the apparatus 100. An advancing/retreating output of an air cylinder 16 coupled to the outer cylinder 14 causes the supply rod 13 to advance and retreat. The advancing/retreating direction is set to such a direction that the supply rod 13 advances obliquely downward and then returns. Thus, a center axis O-O of the supply rod 13 is inclined as illustrated in the drawings.

A retaining structure portion 17 configured to retain the bolt 1 is provided at a distal end portion of the supply rod 13. Although details of the structure of the retaining structure portion 17 are described later, the bolt 1 having passed through a supply passage part for the bolt 1 is retained by the retaining structure portion 17 at the distal end portion of the supply rod 13.

There may be adopted various supply passages as the supply passage part for the bolt 1, and examples of the supply passages comprise a supply passage configured to allow the bolt 1 stopped at an end portion of a supply pipe to be transferred to the supply rod 13 and retained thereat and a supply passage configured to allow the bolt 1 to be transferred in a suspended state and retained thereat with a guide rail arranged in a substantially horizontal direction. Here, the case of the supply pipe 18 indicated by solid lines in FIG. 1 is given.

A longitudinal direction of the supply pipe 18 forms an acute angle with respect to the center axis O-O. A welding portion 19, which is indicated in a solid black color, integrates the supply pipe 18 with the outer cylinder 14. A supply hose 20, which is joined to the supply pipe 18 and is made of a synthetic resin, extends from a part feeder (not shown).

The supply pipe 18 has a circular cross section and has a stopper member 21 formed at a terminal end thereof. In order to transfer the bolt 1 stopped at the stopper member 21 to the retaining structure portion 17, an outlet opening 22 is formed at a lower portion of the supply pipe 18. In order to temporarily lock the bolt 1 having reached the stopper member 21, a gate member 23 of an opening/closing type is provided.

A method of advancing and retreating the gate member 23 is illustrated in FIG. 1(B). The air cylinder 26 is fixed to a bracket 25 coupled to the outer cylinder 14, and the gate member 23 is coupled to a piston rod 27 of the air cylinder 26.

A magnet 28 is fixed to an end portion of the outer cylinder 14. When the gate member 23 is opened, an attraction force of the magnet 28 causes the bolt 1 to be forcibly transferred to the retaining structure portion 17 through the outlet opening 22. Meanwhile, as indicated by the two-dot chain lines in FIG. 1(A) and as illustrated in FIG. 1(D), in a case in which the bolt 1 is forcibly transferred in a suspended state (hung state) along a guide rail 29 extending in a substantially horizontal direction, the bolt 1 reaches the retaining structure portion 17 at high speed. Thus, in the case of using the guide rail 29, the magnet 28 may be omitted. Alternatively, also in a case in which the center axis O-O in FIG. 1(A) is further laid so that the bolt 1 is transferred to be dropped onto the retaining structure portion 17, the magnet 28 may be omitted. Therefore, according to the present invention, the presence or absence of the magnet 28 may be suitably selected. As illustrated in FIG. 1(A), the magnet 28 is accommodated in a container made of stainless steel being a non-magnetic material, and the container is welded to an end portion of the outer cylinder 14.

Next, the retaining structure portion is described.

The retaining structure portion 17 is configured to reliably retain the bolt 1 at a predetermined location on the distal end portion of the supply rod 13 and, after the supply rod 13 advances, insert the bolt 1 into a target location such as the opening 7, the prepared hole 10 and the receiving hole 11.

Clearer illustrations are given in FIG. 3, and description is made mainly with reference to FIG. 3. A distal end surface 30 with which a surface 4 of the flange 2 is to be brought into close contact is formed at the distal end portion of the supply rod 13. The supply rod 13 comprises an inner shaft 32 inserted into a hollow shaft 31 having a hollow tube shape so that the inner shaft 32 can advance and retreat. The distal end surface 30 is formed of an end surface of the hollow shaft 31 and an end surface of the inner shaft 32 which are arranged on one imaginary plane.

Figure 5:
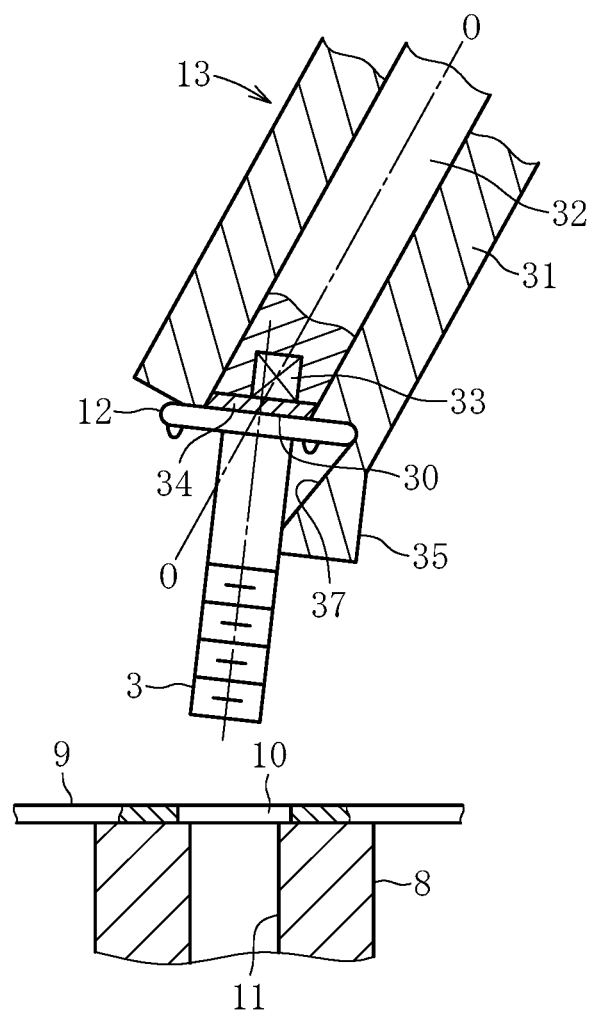
FIG. 5 is a sectional view for illustrating a modification example.

The close contact of the surface 4 of the flange 2 with the distal end surface 30 is achieved with a magnet (permanent magnet) 33 of an advancing/retreating type provided in the supply rod 13. Here, the magnet 33 is mounted at an end portion of the inner shaft 32. An end surface of the magnet 33 is also arranged on the imaginary plane and forms a part of the distal end surface 30. However, it is not always required that the magnet 33 be exposed in such a manner. As illustrated in FIG. 5, a cover plate 34 may be mounted to the end surface of the inner shaft 32, and a surface of the cover plate may be arranged on the imaginary plane.

Figure 3A:
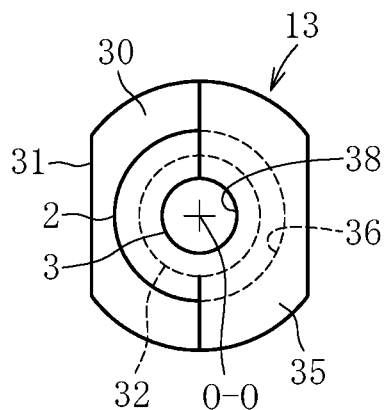
FIG. 3A is a view for illustrating the supply rod of FIG. 1A as seen from a lower side.
Figure 3B:
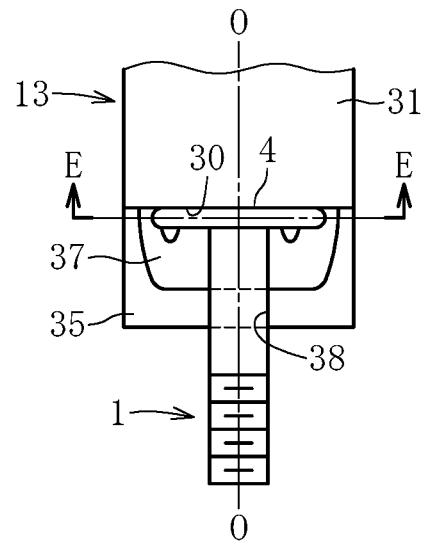
FIG. 3B is a view for illustrating a lower portion of the supply rod of FIG. 1A as seen from the left side of the line O-O.

A projection portion 35 is formed on the distal end surface 30 of the supply rod 13. The projection portion 35 extends from the hollow shaft 31 on a lower side along the inclination of the supply rod 13, that is, on a lower side of the center axis O-O and projects over a region corresponding to a lower half of flange 2. FIG. 3(A) is an illustration of a state in which the supply rod 13 illustrated in FIG. 1(A) and FIG. 2 is seen from a lower side. Thus, in FIG. 3(A), the projection portion 35 projects over a region occupying almost a right half of the supply rod 13. In order to cause the attraction force of the magnet 28 to more strongly act on the bolt 1, the hollow shaft 31 is made of a non-magnetic material, and the projection portion 35 is also made of a non-magnetic material.

At a boundary location between the distal end surface 30 and the projection portion 35, there is formed a circular-arc receiving surface 36 fitting the outer peripheral portion 12 of the flange 2. In FIG. 3(A), the projection portion 35 projects over the region occupying almost the right half of the supply rod 13, and hence the circular-arc receiving surface 36 is also formed over the region occupying almost the right half of the supply rod 13. That is, the circular-arc receiving surface 36 is formed so that the circular-arc receiving surface 36 extends in a region of about 180 degrees. The circular-arc shape of the circular-arc receiving surface 36 is a circular arc about the center axis O-O of the supply rod 13.

Figure 3C:
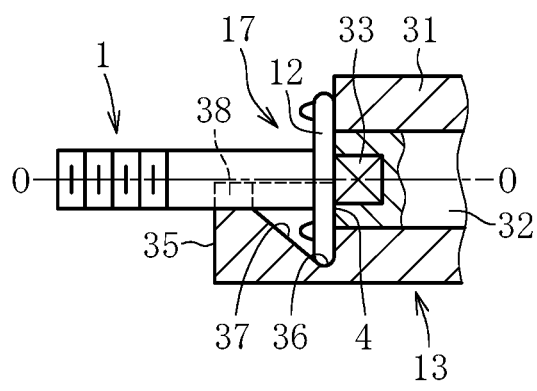
FIG. 3C is a sectional view taken along the line O-O of FIG. 3B.
Figure 3D:
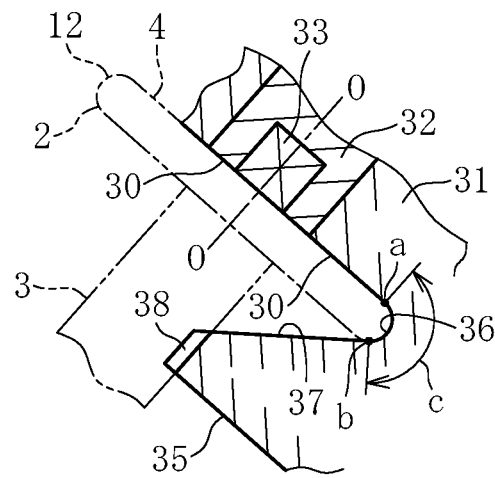
FIG. 3D is an enlarged sectional view for illustrating a lower end portion of the supply rod.
Figure 3E:
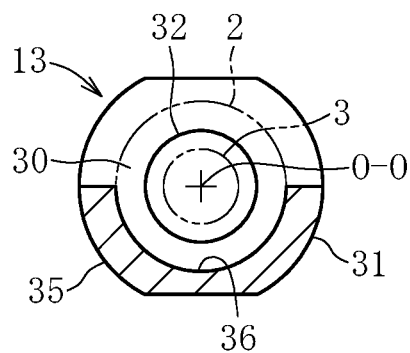
FIG. 3E is a sectional view taken along the line E-E of FIG. 3B.

As illustrated in the drawings, especially as illustrated in FIG. 3(D), the outer peripheral portion 12 of the flange 2 has a round shape in the cross-sectional direction along the center axis of the bolt 1. Thus, the circular-arc receiving surface 36 corresponding to the outer peripheral portion 12 also has a round recessed shape in the cross-sectional direction along the center axis O-O of the supply rod 13. In a case where the outer peripheral portion 12 of the flange 2 has an angular cylindrical shape, the circular-arc receiving surface 36 also has a shape which enables close contact with such the angular cylindrical shape. Please note that the term of "circular-arc" about the circular-arc receiving surface 36 or the outer peripheral portion 12 of the flange 2 does not mean a roundness which appears in a cross-section along the center axis O-O of the supply rod 13 or the center axis of the bolt 1, but means a shape which appears in a cross-section perpendicular to the center axis O-O of the supply rod 13 or the center axis of the bolt 1.

As the bolt 1 is transferred, when the outer peripheral portion 12 of the flange 2 fits the circular-arc receiving surface 36, and the surface 4 of the flange 2 is attracted to the distal end surface 30 with the magnet 33, the flange 2 is positioned in the axial direction and the radial direction of the bolt 1, and the bolt 1 is retained on the center axis O-O of the supply rod 13. At this time, the outer peripheral portion 12 of the flange 2 fits the circular-arc receiving surface 36 in a contact state over an angle range of about 180 degrees. However, even when the angle of about 180 degrees is reduced to about 150 degrees, the close contact with the distal end surface 30 enables positioning of the flange 2 in the axial direction and the radial direction of the bolt 1.

It is appropriate to set the angle range within the range of from 180 degrees to 150 degrees. When the angle is more than 180 degrees, the outer peripheral portion 12 may be caught at the time of approach of the flange 2. When the angle is equal to or less than 150 degrees, a contact circular-arc angle of the outer peripheral portion 12 is excessively small. Thus, even when the surface 4 is attracted to the distal end surface 30, some slight external force that acts on the bolt 1 may cause deviation of the flange 2 in the radial direction.

When seen in a cross-sectional direction along the center axis O-O, that is, on the cross sections illustrated in FIG. 3(C) and FIG. 3(D), one side of the circular-arc receiving surface 36 is continuous with the distal end surface 30, and another side of the circular-arc receiving surface 36 is continuous with the inclined guide surface 37.

As illustrated in FIG. 3(D), the continuous location between the circular-arc receiving surface 36 and the distal end surface 30 is indicated by a black point "a". Moreover, the continuous location between the circular-arc receiving surface 36 and the inclined guide surface 37 is indicated by a black point "b". As is clear from such illustration, a range between the points a and b of the circular-arc receiving surface 36, as indicated by symbol "c", has a roundness fitting the roundness of the outer peripheral portion 12 of the flange 2.

A recess portion 38 is formed at a center portion on an inner side of a distal end of the projection portion 35, and the shaft portion 3 is fitted to the recess portion 38. Thus, the bolt 1 is supported at two points, specifically, at two locations comprising the circular-arc receiving surface 36 and the recess portion 38.

As illustrated in FIG. 1(C) and FIG. 3(A), the supply rod 13 has an oval shape, and a planar portion thereof makes sliding motion with respect to the stationary member, thereby preventing a rotary motion of the supply rod 13 during an advancing and retreating operation of the supply rod 13.

In the cases illustrated in FIG. 1 to FIG. 4, the center axis O-O perpendicularly intersects the distal end surface 30, and hence the axis of the bolt 1 and the center axis O-O are coaxial with each other. In place of such arrangement of axes, as illustrated in FIG. 5, the center axis O-O may be inclined with respect to the distal end surface 30 so that the axis of the bolt 1 and the center axis O-O intersect with each other. Compared with the bolt 1 indicated by the solid line in FIG. 1(A), the bolt 1 is displaced in a standing posture.

Next, an advancing/retreating structure for the magnet is described.

The magnet 33 is separated away from the flange 2 to substantially eliminate the attraction force acting on the bolt 1. As a structure for such operation, there may be adopted a structure of coupling a thin rod member to the magnet 33 and advancing and retreating the rod member to advance and retreat the magnet 33 with respect to the flange 2, or a structure of coupling an air cylinder to the end portion of the inner shaft 32 and advancing and retreating the inner shaft 32. Here, the latter structure of an inner-shaft advancing/retreating type is adopted.

As described above, the supply rod 13 comprises the inner shaft 32 inserted into the hollow shaft 31 having a hollow tube shape so that the inner shaft 32 can advance and retreat. A regulation pin 39 fitted to the inner shaft 32 projects into the outer cylinder 14 through an elongated hole 40 opened in the hollow shaft 31. A compression coil spring 41 is interposed between an upper end portion of the inner shaft 32 and an inner end surface of the hollow shaft 31. A resilient force of the compression coil spring 41 acts in a direction of pushing out the inner shaft 32, and the regulation pin 39 is held in abutment against a lower end of the elongated hole 40 by the resilient force. In this state, the distal end surface 30 forms a flat attraction surface.

An air cylinder 43 as a driving unit is fixed to an outer surface of the outer cylinder 14. An engagement piece 45 is coupled to a piston rod 44 of the air cylinder 43 and projects into the outer cylinder 14 through an elongated hole 46 opened in the outer cylinder 14. Relative positions of the engagement piece 45 and the regulation pin 39 are set so that, when the supply rod 13 moves by a stroke of a predetermined length, the regulation pin 39 can be opposed to the engagement piece 45.

Next, an operation is described.

The bolt 1 having been transferred from the supply hose 20 to the supply pipe 18 is brought into abutment against the stopper member 21 and stops thereat, and is brought into a stationary state by the gate member 23 at a closing position.

Next, when the gate member 23 is opened by an operation of the air cylinder 26, the bolt 1 is transferred in a substantially horizontal direction in a standing state by the attraction force of the magnet 28, and the flange 2 reaches the vicinity of the distal end surface 30 and further advances toward the circular-arc receiving surface 36. With this, the outer peripheral portion 12 of the flange 2 fits the circular-arc receiving surface 36, and the surface 4 of the flange 2 is attracted to the distal end surface 30 by the attraction force of the magnet 33 at the advanced position. At the same time, the shaft portion 3 is received in the recess portion 38 at a distal end portion of the projection portion 35. A contact range of the outer peripheral portion 12 with respect to the circular-arc receiving surface 36, that is, a fitting region is about 180 degrees in this case.

Therefore, the bolt 1 is supported at two locations through the contact of the outer peripheral portion 12 of the flange 2 with the circular-arc receiving surface 36 and through the contact of the shaft portion 3 with the distal end portion of the projection portion 35. In such a manner, the bolt 1 is positioned in the axial direction and the radial direction so that the bolt 1 is retained on the center axis O-O of the supply rod 13.

Figure 4A:
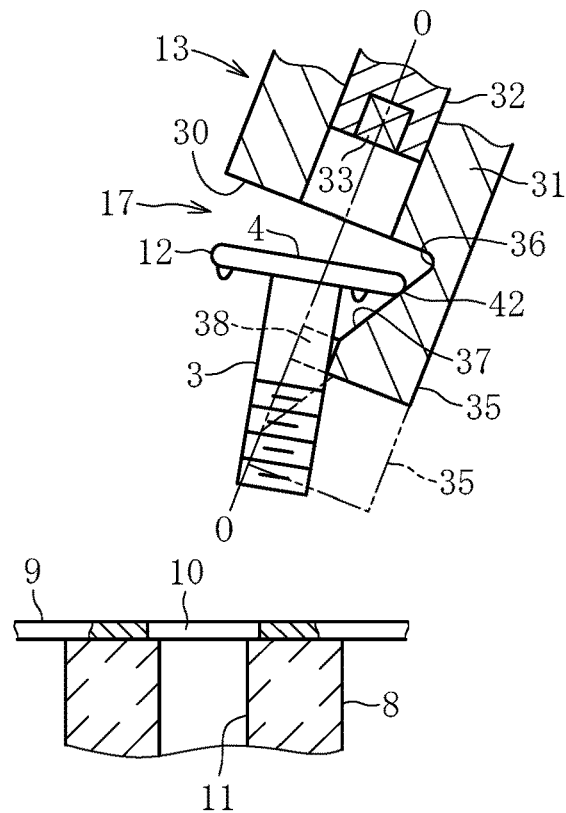
FIG. 4A is a sectional view for illustrating a state in which a shaft-like component is falling.
Figure 4B:
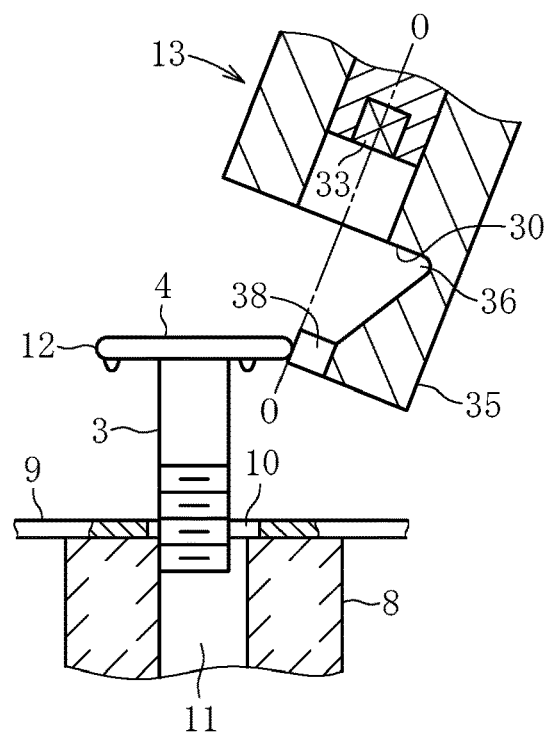
FIG. 4B is a sectional view for illustrating a state in which the shaft-like component falls.

After that, when the operation of the air cylinder 16 causes the supply rod 13 to advance over a predetermined length so that the distal end of the shaft portion 3 reaches the vicinity of the opening 7, the supply rod 13 stops (see FIG. 2), and at the same time, the regulation pin 39 stops immediately before reaching the engagement piece 45. Then, when the engagement piece 45 is brought into abutment against the regulation pin 39 by a retreating operation of the air cylinder 43, the inner shaft 32 retreats while compressing the compression coil spring 41. With this retreating action, as illustrated in FIG. 4, the magnet 33 also retreats, thereby eliminating the attraction force with respect to the bolt 1.

As a result of the elimination of the attraction force, the bolt 1 starts falling by its own weight. As illustrated in FIG. 4(A), while the outer peripheral portion 12 of the flange 2 slides on the inclined guide surface 37, and at the same time, the shaft portion 3 slide on the distal end portion of the projection portion 35, that is, while exhibiting a state of sliding at the two locations, the bolt 1 falls by its own weight. At the time of falling, the bolt 1 approaches the opening 7 or the prepared hole 10 while generating a constant and uniform circular-arc trajectory. As the falling progresses, the distal end of the shaft portion 3 is brought into a state of being substantially coaxial with the opening 7 or the prepared hole 10, and the shaft portion 3 is inserted while such a state is maintained. With respect to one of the two locations described above, the outer peripheral portion 12 conducts the sliding motion continuously from the circular-arc receiving surface 36. Thus, when the sliding location of the outer peripheral portion 12 and the sliding location of the shaft portion 3 are traced moment by moment, the circular-arc trajectory of the bolt 1 is uniform as described above. The sliding location of the outer peripheral portion 12 with respect to the inclined guide surface 37 is indicated by symbol 42 in FIG. 4(A).

In place of the air cylinder of various types described above, an electric motor configured to give an advancing/retreating output can also be adopted.

The operations of the air cylinder 16 for advancing and retreating the supply rod 13 and the operations of the air cylinder 43 for advancing and retreating the engagement piece 45 described above can be performed by a control method which is generally adopted. Predetermined operations can reliably be performed through combinations of, for example, an air switching valve configured to operate based on signals from a control device or a sequence circuit and a sensor configured to emit a signal at a predetermined position of the air cylinder and sent the signal to the control device.

Functions and effects of the embodiment described above are given below.

When the flange 2 of the bolt 1 approaches the vicinity of the distal end surface 30 of the supply rod 13, the flange 2 advances to the boundary location between the distal end surface 30 and the projection portion 35 of the supply rod 13, that is, to the circular-arc receiving portion 36 formed at a corner portion located at a root location on an inner side of the projection portion 35, thereby causing the outer peripheral portion 12 of the flange 2 to fit the circular-arc receiving surface 36 and causing the surface 4 of the flange 2 to be attracted to the distal end surface 30 of the supply rod 13 by the attraction force of the magnet 33 at the advanced position. With such operation, while the one side of the circular-arc receiving surface 36 is continuous with the distal end surface 30, the surface 4 of the flange 2 is brought into close contact with the distal end surface 30 of the supply rod 13, and at the same time, the flange outer peripheral portion 12 fits the circular-arc receiving surface 36. Therefore, the flange 2 is positioned in the axial direction and the radial direction of the bolt 1 so that the bolt 1 is retained on the center axis O-O of the supply rod 13.

After that, when the magnet 33 retreats so that the attraction force acting on the bolt 1 is substantially eliminated, while another side of the circular-arc receiving surface 36 is continuous with the inclined guide surface 37, the flange outer peripheral portion 12 starts sliding on the inclined guide surface 37, and at the same time, the shaft portion 3 also slide on the projection portion 35, that is, the bolt 1 falls by its own weight while exhibiting the state of sliding at the two locations. There are two sliding locations in such manner, therefore the circular-arc trajectory of the bolt 1 is always maintained uniform, and the distal end of the bolt 1 accurately approaches an opening as the target location. Moreover, the bolt 1 performs the falling motion exhibiting the circular-arc trajectory immediately from the state in which the surface 4 of the flange 2 is held in close contact with the distal end surface 30 of the supply rod 13. Thus, the smooth falling motion of the bolt 1 is started at the same time when the attraction force of the magnet 33 is eliminated. That is, the inclined guide surface 37 is continuous with the circular-arc receiving surface 36, and hence the flange outer peripheral portion 12 starts the sliding on the inclined guide surface 37 immediately from the circular-arc receiving surface 36, thereby forming a uniform circular-arc trajectory.

A circular-arc-shaped portion of the flange outer peripheral portion 12 fits a circular-arc-shaped portion of the circular-arc receiving surface 36, and the surface 4 of the flange 2 is attracted to the distal end surface 30 of the supply rod 13. With this, the bolt 1 is positioned on the center axis O-O. Thus, even when some external force acts on the bolt 1, accuracy of the retaining position of the bolt 1 is not easily lost, and hence the retaining position is reliably maintained.

As described above, owing to the positioning of the flange 2 at the distal end portion of the supply rod 13 and the sliding motion of the bolt 1 at the two locations during the falling of the bolt 1, the retaining position of the bolt 1 with respect to the supply rod 13 is accurately maintained. Further, the bolt 1 falls with keeping a uniform circular-arc trajectory, thereby securing high accuracy and reliability of the supply rod 13 which is. At the same timing as the start of the falling of the bolt 1, the flange outer peripheral portion 12 slides on the inclined guide surface 37, thereby reliably achieving the sliding motion of the bolt 1 at the two locations.

Further, the outer peripheral portion 12 keeps sliding on the inclined guide surface 37, so that the bolt 1 falls while generating a uniform circular-arc trajectory to be inserted into the target location such as the opening 7 or the prepared hole 10.

INDUSTRIAL APPLICABILITY

With the supply rod according to the present invention, the shaft-like component retained at the distal end portion of the supply rod is accurately positioned on the center axis of the supply rod, and is inserted into an opening as the target location while allowing the shaft portion to always generate the uniform circular-arc trajectory. Thus, the supply rod can be used in a wide variety of industrial fields such as a welding step for a vehicle body of an automobile and a welding step for a plate metal of a home electric appliance.

REFERENCE SIGNS LIST

1 shaft-like component, projection bolt
2 flange
3 shaft portion
4 surface
6 component having hole
7 opening
9 steel-sheet component
10 lower hole
12 outer peripheral portion
13 supply rod
14 outer cylinder
17 retaining structure portion
28 magnet
30 distal end surface
33 magnet
35 projection portion
36 circular-arc receiving surface
37 inclined guide surface
38 recess portion
100 bolt supply apparatus
O-O center axis

The invention claimed is:
1. A supply rod for a shaft-shaped component, wherein the supply rod is configured to supply the shaft-shaped component having a circular flange and a shaft portion integrated with each other, and wherein an outer peripheral portion of the circular flange has a round shape in a cross-sectional direction along a center axis of the shaft-shaped component, the supply rod comprising:
   a projection portion formed on a distal end surface of the supply rod with which a surface of the circular flange is to be brought into close contact;
   a circular-arc receiving surface formed at a boundary portion between the distal end surface and the projection portion, the circular-arc receiving surface having a round recessed shape in a cross-sectional direction along a center axis of the supply rod so as to fit the round shape of the outer peripheral portion of the circular flange; and
   a recess portion, to which the shaft portion is to be fitted, formed at a center portion on an inner side of a distal end of the projection portion, wherein the circular-arc receiving surface has a circular-arc shape around the center axis of the supply rod, wherein, when seen in the cross-sectional direction along the center axis of the supply rod, one side of the circular-arc receiving surface is continuous with the distal end surface, and another side of the circular-arc receiving surface is continuous with an inclined guide surface formed on an inner side of the projection portion, wherein the supply rod is configured such that, when released, the shaft-shaped component falls by its own weight, while the outer peripheral portion of the circular flange slides on the inclined guide surface and the shaft portion slides on the recess portion of the projection portion, and wherein the close contact of the surface of the circular flange with the distal end surface is achieved with a magnet of an advancing/retreating type provided in the supply rod.

* * * * *